(12) United States Patent
Jo et al.

(10) Patent No.: US 11,479,214 B2
(45) Date of Patent: Oct. 25, 2022

(54) LIDAR SENSOR

(71) Applicant: HYUNDAI MOBIS Co., Ltd., Seoul (KR)

(72) Inventors: Sung Eun Jo, Yongin-si (KR); Kyung Rin Kim, Yongin-si (KR); Won Gyum Kim, Yongin-si (KR); Young Shin Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 730 days.

(21) Appl. No.: 16/421,415

(22) Filed: May 23, 2019

(65) Prior Publication Data

US 2019/0361227 A1 Nov. 28, 2019

(30) Foreign Application Priority Data

May 25, 2018 (KR) ........................ 10-2018-0059523

(51) Int. Cl.
*B60S 1/56* (2006.01)
*G02B 27/00* (2006.01)
*B08B 1/00* (2006.01)
*B08B 3/02* (2006.01)
*B08B 5/02* (2006.01)
(Continued)

(52) U.S. Cl.
CPC .............. *B60S 1/566* (2013.01); *B08B 1/002* (2013.01); *B08B 3/02* (2013.01); *B08B 5/02* (2013.01); *B60S 1/542* (2013.01); *G01S 7/4811* (2013.01); *G02B 27/0006* (2013.01); *B08B 3/00* (2013.01); *B08B 3/08* (2013.01); *B21B 45/0269* (2013.01); *B60S 1/522* (2013.01); *B60S 2001/3834* (2013.01); *B65G 45/10* (2013.01); *G01S 7/481* (2013.01); *G05D 1/0231* (2013.01)

(58) Field of Classification Search
CPC .................................................. G02B 27/0006
See application file for complete search history.

(56) References Cited

U.S. PATENT DOCUMENTS 2,743,617 A * 5/1956 McClelland .............. B60S 1/18
 74/96
3,176,336 A * 4/1965 Scinta ...................... B60S 1/34
 15/250.351
(Continued)

FOREIGN PATENT DOCUMENTS

EP 3141441 A1 * 3/2017
GB 1332290 A * 10/1973
(Continued)

*Primary Examiner* — Spencer E. Bell
*Assistant Examiner* — Omair Chaudhri
(74) *Attorney, Agent, or Firm* — H.C. Park & Associates, PLC

(57) ABSTRACT

A LiDAR sensor may include: a housing; a window cover installed on the housing; a motor mounted in the housing; a rotating shaft rotated by the motor; a guide connected to the rotating shaft and rotated along the surface of the window cover; and a brush mounted on the guide so as to face the window cover, contacted with the window cover, and washing the surface of the window cover with rotation of the guide. The guide may include: a first guide part connected to the rotating shaft; a second guide part rotatably connected to the housing; and a third guide part connected to the first and second guide parts, formed in a U-shape so as to face the window cover, and having the brush mounted thereon.

3 Claims, 6 Drawing Sheets

(51) Int. Cl.
  *B60S 1/54* (2006.01)
  *B08B 3/00* (2006.01)
  *B60S 1/52* (2006.01)
  *B60S 1/38* (2006.01)
  *G01S 7/481* (2006.01)
  *G05D 1/02* (2020.01)
  *B21B 45/02* (2006.01)
  *B65G 45/10* (2006.01)
  *B08B 3/08* (2006.01)

(56) References Cited

U.S. PATENT DOCUMENTS

| | | | | |
|---|---|---|---|---|
| 5,430,907 A | * | 7/1995 | Jutras | B60S 1/34 15/250.21 |
| 5,621,944 A | * | 4/1997 | Sekiguchi | B60S 1/3477 15/250.31 |
| 2002/0112308 A1 | * | 8/2002 | Zimmer | B60S 1/3468 15/250.352 |
| 2010/0242203 A1 | * | 9/2010 | Boland | B60S 1/3468 15/250.3 |
| 2013/0036570 A1 | * | 2/2013 | Hartman | B60S 1/38 15/250.31 |
| 2013/0209079 A1 | * | 8/2013 | Alexander | H04N 5/2252 396/25 |
| 2014/0267715 A1 | * | 9/2014 | Kemege | G02B 27/0006 348/143 |
| 2015/0201826 A1 | * | 7/2015 | Hsu | A61B 1/018 600/121 |
| 2015/0296108 A1 | * | 10/2015 | Hayakawa | B60R 1/00 348/148 |
| 2016/0059922 A1 | * | 3/2016 | Majka | B62J 11/13 280/158.1 |
| 2016/0138669 A1 | * | 5/2016 | Yang | B25B 27/02 254/133 R |
| 2016/0244028 A1 | * | 8/2016 | Wakatsuki | B60S 1/566 |
| 2016/0304058 A1 | * | 10/2016 | Kong | B60S 1/3434 |
| 2016/0315564 A1 | * | 10/2016 | Kotani | G02B 27/0006 |
| 2017/0250096 A1 | * | 8/2017 | Wang | H01L 21/67046 |
| 2017/0369039 A1 | * | 12/2017 | Rousseau | H04N 5/2251 |
| 2018/0215350 A1 | * | 8/2018 | Herrmann | G02B 27/0006 |
| 2018/0265048 A1 | * | 9/2018 | Schmidt | B08B 5/02 |
| 2018/0370500 A1 | * | 12/2018 | Garcia Crespo | A47L 5/28 |
| 2019/0146213 A1 | * | 5/2019 | Slama | B60S 1/583 359/511 |
| 2019/0179140 A1 | * | 6/2019 | Oba | H04N 7/183 |
| 2020/0062220 A1 | * | 2/2020 | Schäfer | B60S 1/38 |
| 2020/0307525 A1 | * | 10/2020 | Sparbert | B60S 1/52 |
| 2020/0355808 A1 | * | 11/2020 | Albuquerque | B60S 1/544 |

FOREIGN PATENT DOCUMENTS

| | | | |
|---|---|---|---|
| JP | 2006176028 A | * | 7/2006 |
| KR | 20120126683 | | 11/2012 |
| KR | 20130097375 | | 9/2013 |
| KR | 20130126330 A | * | 11/2013 |
| KR | 101704342 B1 | * | 2/2017 |
| KR | 10-2018-0011510 | | 2/2018 |

* cited by examiner

LIDAR SENSOR

CROSS-REFERENCES TO RELATED APPLICATIONS

This application claims priority from and the benefit of Korean Application No. 10-2018-0059523, filed on May 25, 2018, which is hereby incorporated by reference for all purposes as if set forth herein.

BACKGROUND

Field

Exemplary embodiments relate to a LiDAR (Light Detection and Ranging) sensor, and more particularly, to a LiDAR sensor which can wash a window cover from which laser is emitted, so that a transmitting/receiving operation of laser is normally performed.

Discussion of the Background

Recently, research is being actively conducted on autonomous vehicles. In particular, autonomous vehicles require an autonomous parking function and the like. Thus, the necessity of a LiDAR sensor having excellent distance resolution is increasing. The LiDAR sensor is mounted on a bumper of a vehicle, and senses an object or structure around the vehicle by sensing the front and rear of the vehicle.

When the LiDAR sensor is contained in a structure such as glass, the sensing performance of the LiDAR sensor may be significantly degraded. Thus, the LiDAR sensor is mounted so as to be exposed to the outside. Therefore, a LiDAR sensor mounted on a front bumper of a vehicle needs to be exposed to the outside. In general, the LiDAR sensor includes a laser, a detector and a driver, and separately has a cover to protect the LiDAR sensor from foreign matters. This cover has a hot wire mounted therein to remove moisture or snow on the surface thereof.

Since the LiDAR sensor according to the related art measures a distance by transmitting and receiving laser, the LiDAR sensor is very sensitive to contamination of the cover. The hot wire can remove external moisture or water, but has difficulties in removing contaminants such as dust or mud. Therefore, there is a demand for a structure capable of solving the problem.

The related art of the present invention is disclosed in Korean Patent Publication No. 10-2018-0011510 published on Feb. 2, 2018 and entitled "LiDAR sensor system for near field detection".

The above information disclosed in this Background section is only for enhancement of understanding of the background of the invention and, therefore, it may contain information that does not constitute prior art.

SUMMARY

Exemplary embodiments of the present invention are directed to a LiDAR sensor which can wash a window cover from which laser is emitted, so that a transmitting/receiving operation of laser is normally performed.

In one embodiment, a LiDAR sensor may include: a housing; a window cover installed on the housing; a motor mounted in the housing; a rotating shaft rotated by the motor; a guide connected to the rotating shaft and rotated along the surface of the window cover; and a brush mounted on the guide so as to face the window cover, contacted with the window cover, and washing the surface of the window cover with rotation of the guide. The guide may include: a first guide part connected to the rotating shaft; a second guide part rotatably connected to the housing; and a third guide part connected to the first and second guide parts, formed in a U-shape so as to face the window cover, and having the brush mounted thereon. The LiDAR sensor may further include a damper installed between the first and third guide parts or between the second and third guide parts, and providing an elastic force to press the brush against the window cover.

The damper may include: a damper body inserted and installed between the first and third guide parts or between the second and third guide parts; and an elastic part housed in the damper body, connecting the first and third guide parts or the second and third guide parts to each other, and providing an elastic force.

The first guide part may include: a first guide body connected to a rotating shaft groove of the rotating shaft; a first guide stopper formed at one end of the first guide body housed in the damper body, and preventing the first guide body from separating from the inside of the damper body to the outside; and a first guide ring formed on the first guide stopper and connected to the elastic part.

The second guide part may include: a second guide body rotatably connected to a housing groove of the housing and formed in an L-shape; a second guide stopper formed at one end of the second guide body housed in the damper body, and preventing the second guide body from separating from the inside of the damper body to the outside; and a second guide ring formed on the second guide stopper and connected to the elastic part.

The third guide part may include: a third guide body inserted into the damper body, formed in a U-shape, and having the brush mounted thereon; a third guide stopper formed at one end of the third guide body, and preventing the third guide body from separating from the inside of the damper body to the outside; and a third guide ring formed on the third guide stopper and connected to the elastic part.

The third guide part may further include a plurality of spraying parts formed in a longitudinal direction of the third guide body formed in a hollow shape. The LiDAR sensor may further include a washing part configured to supply fluid to the third guide body such that the fluid is sprayed onto the window cover through the spraying parts.

The third guide part may further include a fluid blocking part formed in the third guide body, and blocking fluid from flowing to the damper, the fluid being supplied through the washing part.

The washing part may include: a washing solution supply part configured to supply a washing solution to the window cover through the spraying parts; and a gas supply part configured to supply gas for removing the washing solution supplied onto the window cover through the spraying parts or drying the window cover.

The damper body may have a first insertion hole formed at one side thereof such that the first or second guide body is inserted into the first insertion hole, and a second insertion hole formed at the other side thereof such that the third guide body is inserted into the second insertion hole, the first insertion hole may have an inner diameter smaller than outer diameters of the first and second guide stoppers, and the second insertion hole may have an inner diameter smaller than an outer diameter of the third guide stopper.

In the LiDAR sensor in accordance with the embodiment of the present invention, the motor may convert the rotational motion of the rotating shaft into the motion of a wiper, thereby washing the curved window cover.

Furthermore, since the guide and the damper press the window cover of the LiDAR sensor at predetermined pressure, the washing force for the window cover can be improved.

Furthermore, the washing part can spray high-temperature and high-pressure gas onto the window cover, thereby improving a washing force for the window cover.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Hereafter, a LiDAR sensor in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
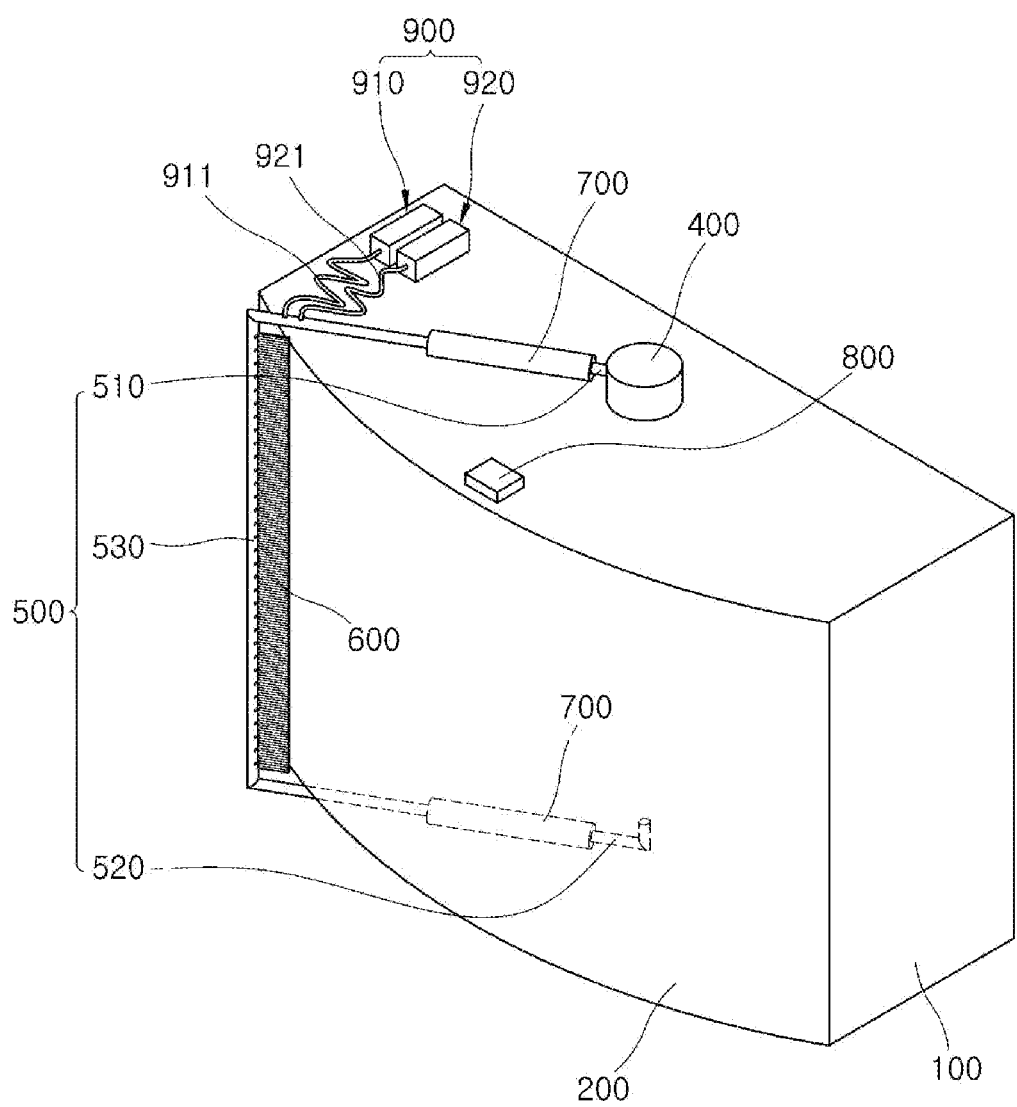
FIG. 1 is a perspective view schematically illustrating a LiDAR sensor in accordance with an embodiment of the present invention.
Figure 2:
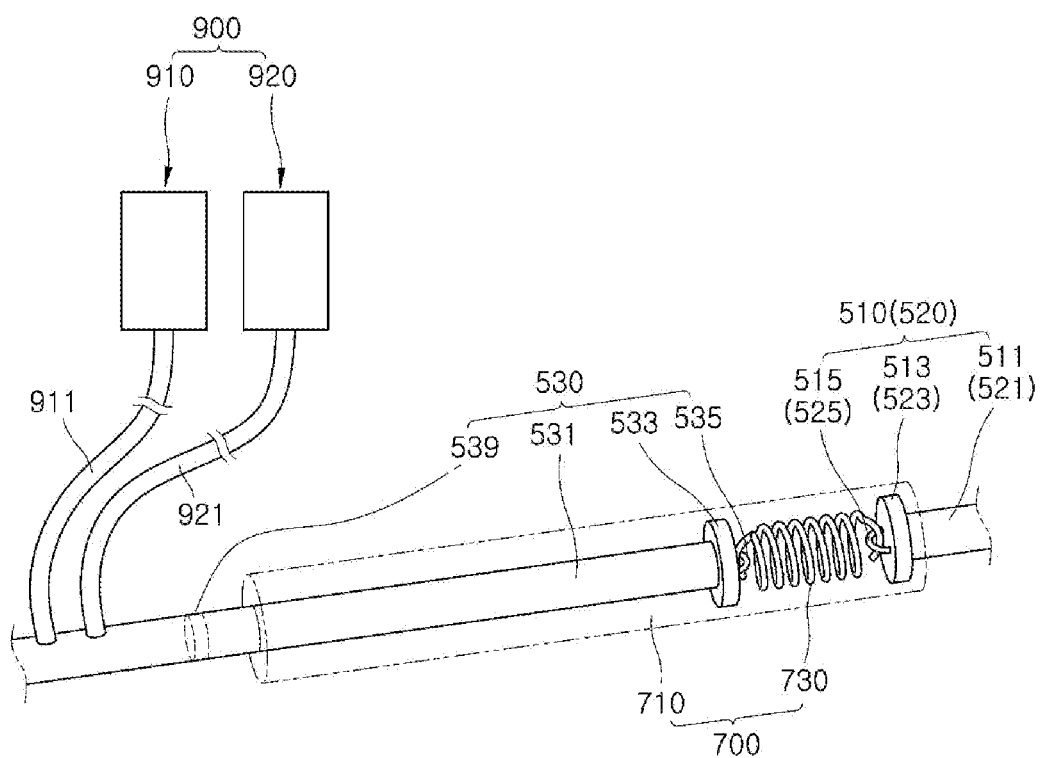
FIG. 2 is a perspective view schematically illustrating a damper in the LiDAR sensor in accordance with the embodiment of the present invention.
Figure 3:
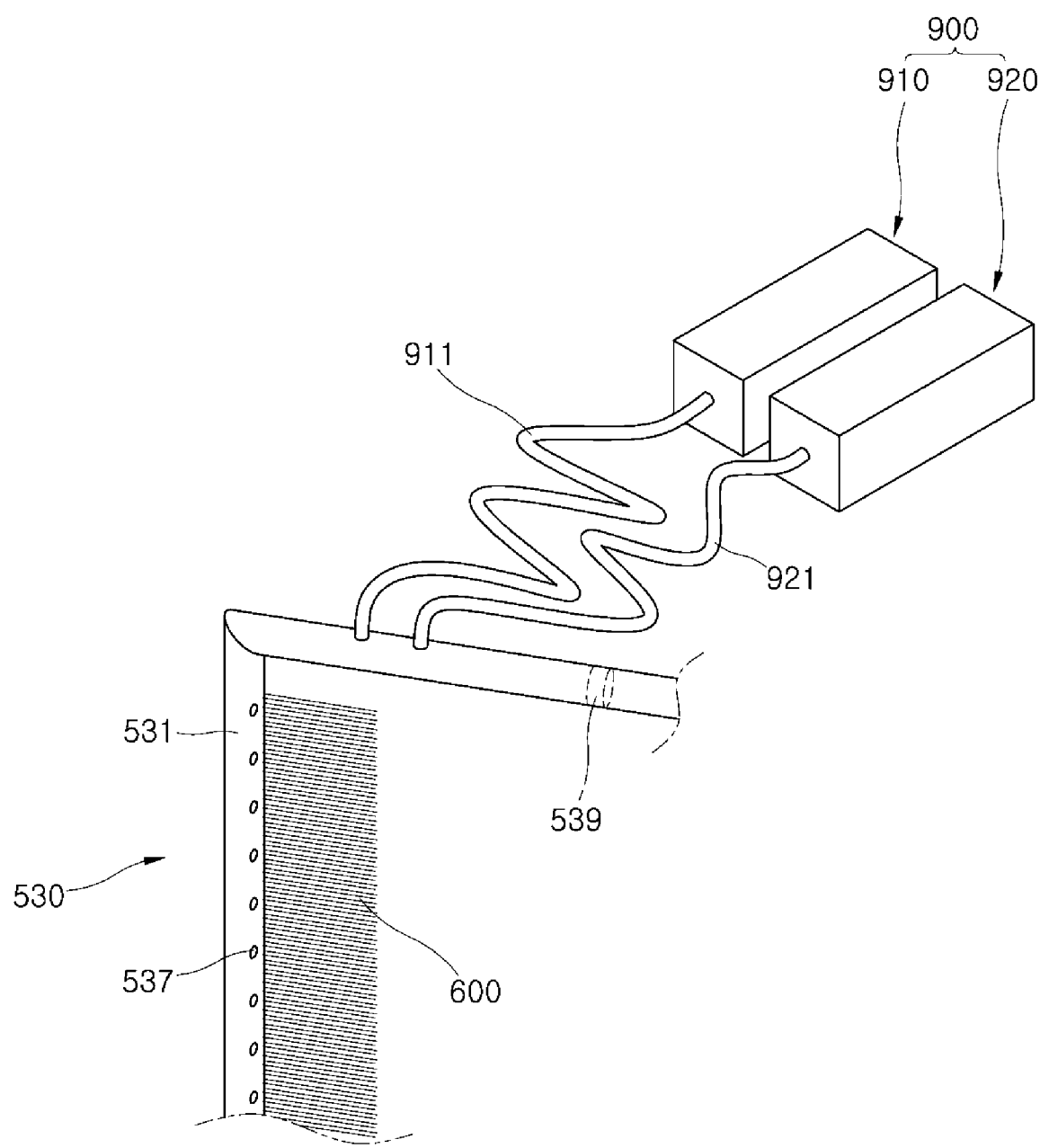
FIG. 3 is a perspective view schematically illustrating a second guide part in the LiDAR sensor in accordance with the embodiment of the present invention.
Figure 4:
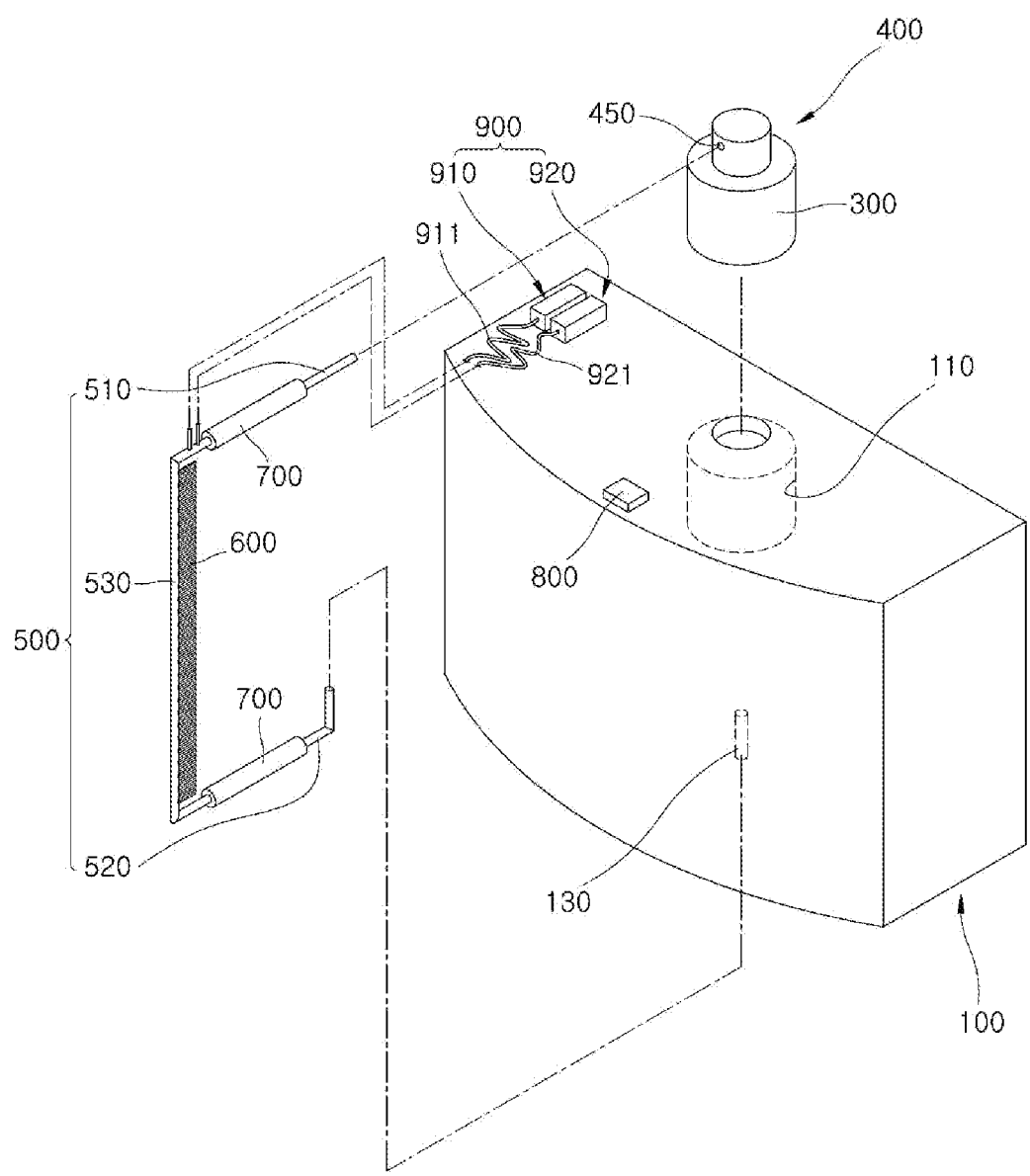
FIG. 4 is an assembled perspective view schematically illustrating the LiDAR sensor in accordance with the embodiment of the present invention.
Figure 5:
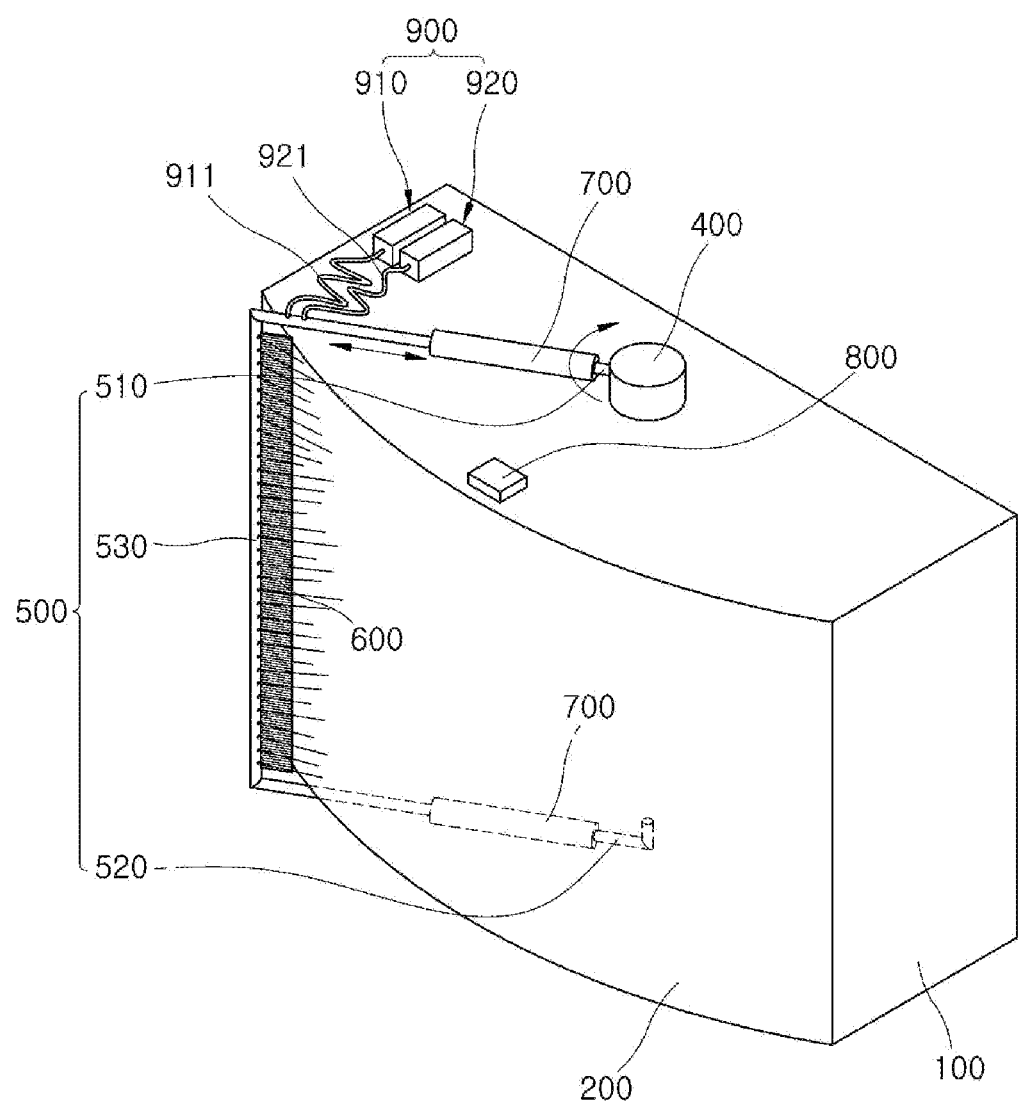
FIG. 5 is a perspective view schematically illustrating an operation of the LiDAR sensor in accordance with the embodiment of the present invention.
Figure 6:
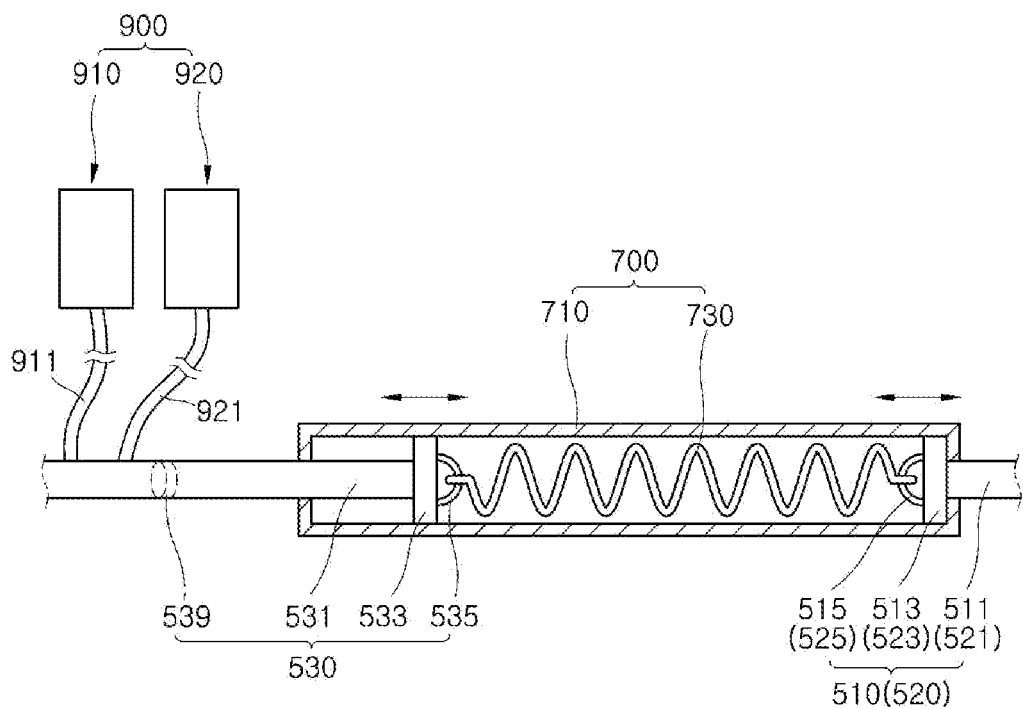
FIG. 6 is a perspective view schematically illustrating an operation of the damper in the LiDAR sensor in accordance with the embodiment of the present invention.

FIG. 1 is a perspective view schematically illustrating a LiDAR sensor in accordance with an embodiment of the present invention, FIG. 2 is a perspective view schematically illustrating a damper in the LiDAR sensor in accordance with the embodiment of the present invention, FIG. 3 is a perspective view schematically illustrating a second guide part in the LiDAR sensor in accordance with the embodiment of the present invention, FIG. 4 is an assembled perspective view schematically illustrating the LiDAR sensor in accordance with the embodiment of the present invention, FIG. 5 is a perspective view schematically illustrating an operation of the LiDAR sensor in accordance with the embodiment of the present invention, and FIG. 6 is a perspective view schematically illustrating an operation of the damper in the LiDAR sensor in accordance with the embodiment of the present invention.

Referring to FIGS. 1 to 4, the LiDAR sensor in accordance with the embodiment of the present invention may include a housing 100, a window cover 200, a motor 300, a rotating shaft 400, a guide 500 and a brush 600.

The housing 100 may include equipment capable of transmitting and receiving laser therein. The window cover 200 may be installed on the front surface (left surface based on FIG. 1) of the housing 100, and formed of a transparent material. Through the window cover 200, laser may be emitted. The window cover 200 may be formed in a curved shape on the front surface of the housing 100.

The motor 300 may be mounted in the housing 100. The motor 300 mounted in the housing 100 may provide rotation power to the rotating shaft 400 exposed to the outside of the housing 100. The motor 300 may be contained in a motor container 110 of the housing 100, and then mounted in the housing 100.

The rotating shaft 400 may be axially connected to the motor 300, and axially rotated by the motor 300. The top of the rotating shaft 400 may be exposed to the outside of the housing 100. The rotating shaft 400 may have a rotating shaft groove 450 formed at the outer surface thereof. A first guide body 511 of a first guide part 510 is inserted and mounted in the rotating shaft groove 450.

The guide 500 may be connected to the rotating shaft 400, rotated with the rotation of the rotating shaft 400, and rotated along the curved surface of the window cover 200. The structure of the guide 500 will be described in detail below.

The brush 600 may be mounted on a third guide part 530 of the guide 500 so as to contact the window cover 200, and wash the surface of the window cover 200 while moved on the surface of the window cover 200 in accordance with the rotation of the guide 500.

The LiDAR sensor in accordance with the embodiment of the present invention may further include a damper 700. The damper 700 may be installed between the first and third guide parts 510 and 530 or between the second and third guide parts 520 and 530, and provide an elastic force to press the brush 600 against the window cover 200. The damper 700 may include a damper body 710 and an elastic part 730.

The damper body 710 may be formed in a hollow shape. The damper body 710 may be inserted and installed between the first and third guide parts 510 and 530, such that the first and third guide parts 510 and 530 can move. Alternatively, the damper body 710 may be inserted and installed between the second and third guide parts 520 and 530, such that the second and third guide parts 520 and 530 can move.

The damper body 710 may have a first insertion hole 711 formed at one side (right side based on FIG. 6) thereof such that a first or second guide body 511 or 521 can move through the first insertion hole 711, and have a second insertion hole 713 formed at the other side (left side based on FIG. 6) thereof such that a third guide body 531 can move through the second insertion hole 713.

The first insertion hole 711 may have an inner diameter smaller than the outer diameter of first and second guide stoppers 513 and 523, and the second insertion hole 713 may have an inner diameter smaller than the outer diameter of a third guide stopper 533. Since the inner diameter of the first insertion hole 711 and the inner diameter of the second insertion hole 713 are smaller than the outer diameter of the first and second guide stoppers 513 and 523 and the outer diameter of the third guide stopper 533, respectively, the first and second guide stoppers 513 and 523 and the third guide stopper 533 may not be separated from the first insertion hole 711 and the second insertion hole 713, respectively. Thus, the first to third guide parts 510 to 530 may be stably inserted into the damper 700, and the contact between the window cover 200 and the third guide part 530 having the brush 600 mounted thereon may be maintained.

The elastic part 730 may be housed in the damper body 710, connect the first and third guide parts 510 and 530 or the second and third guide parts 520 and 530 to each other, and provide an elastic force to the first and third guide parts 510 and 530 or the second and third guide parts 520 and 530. The elastic part 730 may provide an elastic force to the first and third guide parts 510 and 530 or the second and third guide parts 520 and 530, and the brush 600 mounted on the third guide part 530 may maintain the contact with the window cover 200. In an embodiment of the present invention, the elastic part 730 may be provided as a coil spring.

The guide 500 may include the first to third guide parts 510 to 530. The first guide part 510 may be connected to the rotating shaft groove 450 of the rotating shaft 400, and include the first guide body 511, the first guide stopper 513 and a first guide ring 515.

The first guide part 510 may be formed in a rod shape which is connected to the rotating shaft groove 450 of the rotating shaft 400. The first guide part 510 may be disposed on one surface (top surface based on FIG. 1) of the housing 100, and rotated on the one surface of the housing 100 with the rotation of the rotating shaft 400.

The first guide stopper 513 may be formed at an end (left end based on FIG. 2) of the first guide body 511 housed in the damper body 710, and serve to prevent the first guide body 511 from separating from the inside of the damper body 710 to the outside.

The first guide ring 515 may be formed at one side (left side based on FIG. 2) of the first guide stopper 513, and connected to the elastic part 730. As the elastic part 730 is connected to the first guide ring 515, the elastic part 730 and the first guide part 510 may be formed as one body.

The second guide part 520 may be rotatably connected to a housing groove 130 of the housing 100, and include the second guide body 521, the second guide stopper 523 and a second guide ring 525.

The second guide body 521 may be rotatably connected to the housing groove 130 formed at the bottom surface of the housing 100. The second guide body 521 may be formed in an L-shape so as to be disposed on the other surface (bottom surface based on FIG. 1) of the housing 100 while being rotatably connected to the housing groove 130 of the housing 100.

The second guide stopper 523 may be formed at an end (left end based on FIG. 2) of the second guide body 521 housed in the damper body 710, and serve to prevent the second guide body 521 from separating from the inside of the damper body 710 to the outside.

The second guide ring 525 may be formed at one side (left side based on FIG. 2) of the second guide stopper 523, and connected to the elastic part 730. As the elastic part 730 is connected to the second guide ring 525, the elastic part 730 and the second guide part 520 may be formed as one body.

The third guide part 530 may be connected to the first and second guide parts 510 and 520, formed in a U-shape so as to face the window cover 200, and have the brush 600 mounted thereon. The third guide part 530 may include the third guide body 531, the third guide stopper 533 and a third guide ring 535.

The third guide body 531 may be inserted into the damper body 710, and formed in a U-shape. The brush 600 may be mounted on the third guide body 531.

The third guide stopper 533 may be formed at an end (right end based on FIG. 2) of the third guide body 531, and serve to prevent the third guide body 531 from separating from the inside of the damper body 710 to the outside.

The third guide ring 535 may be formed at one side (right side based on FIG. 2) of the third guide stopper 533, and connected to the elastic part 730. As the elastic part 730 is connected to the third guide ring 535, the elastic part 730 and the third guide part 530 may be formed as one body.

The third guide part 530 in accordance with the embodiment of the present invention may further include a spraying part 537. The spraying part 537 may include a plurality of spraying parts formed in the longitudinal direction of the third guide body 531 formed in a hollow shape. Fluid of a washing part 900 which will be described below may be sprayed toward the window cover 200 through the spraying part 537.

The third guide part 530 in accordance with the embodiment of the present invention may further include a fluid blocking part 539. The fluid blocking part 539 may be formed in the third guide body 531, and block fluid from flowing toward the damper 700, the fluid being supplied through the washing part 900. As the fluid blocking part 539 blocks the fluid from flowing toward the damper 700 through the third guide body 531, corrosion of the damper 700 may be prevented. Furthermore, the fluid blocking part 539 may prevent fluid from flowing to the motor 300 or the housing 100 through the first or second guide part 510 or 520 via the damper 700, thereby preventing corrosion of the motor 300 or the housing 100.

The LiDAR sensor in accordance with the embodiment of the present invention may further include the washing part 900. The washing part 900 may supply fluid to the hollow third guide body 531 such that the fluid is sprayed onto the window cover 200 through the spraying part 537 of the third guide part 530.

The washing part 900 may include a washing solution supply part 910 and a gas supply part 920. The washing solution supply part 910 may supply the washing solution to the window cover 200 through the spraying part 537. While the brush 600 is moved on the surface of the cover 200, foreign matters adhering to the window cover 200, such as dust, mud and oil, may be removed by the washing solution supplied by the washing solution supply part 910. The washing solution supply part 910 may supply the washing solution to the third guide body 531 through a washing solution supply pipe 911.

The gas supply part 920 may remove the washing solution supplied to the window cover 200 through the spraying part 537, or supply gas to dry the window cover 200. The gas supplied from the gas supply part 920 may prevent the washing solution from remaining on the window cover 200 and degrading the transmittance of laser. Furthermore, the gas supplied from the gas supply part 920 may prevent rainwater from remaining on the window cover 200 in case of rain. The gas supply part 920 may supply high-temperature and high-pressure gas to the window cover 200. The temperature of the gas supplied from the gas supply part 920 may be adjusted by a controller (not illustrated) based on temperature or humidity sensed by a sensor 800. The gas supply part 920 may supply gas to the third guide body 531 through a gas supply pipe 921.

Referring to FIGS. 5 and 6, the operation of the LiDAR sensor in accordance with the embodiment of the present invention will be described. When foreign matter or rainwater is on the window cover 200, the motor 300 may be operated by the controller. The rotating shaft 400 may be rotated by the motor 300, and the guide 500 may be rotated on the surface of the window cover 200. The brush 600 mounted on the guide 500 may be pressed against the window cover 200, and remove the foreign matter or rainwater on the window cover 200 while moved by the guide 500. At this time, the damper 700 may be elastically deformed to maintain the contact between the brush 600 and the window cover 200.

When the contamination level of the window cover 200 is high due to the foreign matters, a washing solution may be sprayed onto the window cover 200 through the spraying part 573 of the guide 500 through the washing solution supply part 910 of the washing part 900. The washing solution sprayed by the spraying part 573 may be applied to the window cover 200, and the brush 600 may be moved to wash the window cover 200.

The gas supply part 920 of the washing part 900 may spray high-temperature and high-pressure gas onto the window cover 200 through the spraying part 573 of the guide 500. The high-temperature and high-pressure gas may prevent the washing solution from remaining on the window cover 200. Furthermore, the gas supplied from the gas supply part 920 of the washing part 900 may remove foreign matters such as rainwater on the window cover 200.

In the LiDAR sensor in accordance with the embodiment of the present invention, the motor 300 may convert the rotational motion of the rotating shaft 400 into the motion of the wiper, thereby washing the curved window cover 200.

Furthermore, since the guide 500 and the damper 700 press the window cover 200 of the LiDAR sensor at predetermined pressure, the washing force for the window cover 200 can be improved.

Furthermore, the washing part 900 can spray high-temperature and high-pressure gas onto the window cover 200, thereby improving a washing force for the window cover 200.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A LiDAR (Light Detection and Ranging) sensor comprising:
a housing;
a window cover installed on the housing;
a motor mounted in the housing; a rotating shaft configured to be rotated by the motor;
a guide connected to the rotating shaft and configured to be rotated along a surface of the window cover; and
a brush mounted on the guide to face the window cover, contacted with the window cover, and configured to wash clean the surface of the window cover with rotation of the guide,
wherein the guide comprises:
a first guide part connected to the rotating shaft;
a second guide part rotatably connected to the housing; and
a third guide part connected to the first and second guide parts, formed in a U-shape to face the window cover, and having the brush mounted thereon,
wherein the LiDAR sensor further comprises a first damper installed between the first and third guide parts and a second damper installed between the second and third guide parts, and configured to provide an elastic force to press the brush against the window cover,
wherein the first damper comprises:
a first damper body inserted and installed between the first and third guide parts; and
a first elastic part housed in the first damper body, connecting the first and third guide parts to each other, and configured to provide an elastic force,
wherein the second damper comprises:
a second damper body inserted and installed between the second and third guide parts; and
a second elastic part housed in the second damper body, connecting the second and third guide parts to each other, and configured to provide an elastic force,
wherein the first guide part comprises:
a first guide body connected to a rotating shaft groove of the rotating shaft;
a first guide stopper formed at one end of the first guide body housed in the first damper body, and configured to prevent the first guide body from separating from an inside of the first damper body to the outside; and
a first guide ring formed on the first guide stopper and connected to the first elastic part,
wherein the second guide part comprises:
a second guide body rotatably connected to a housing groove of the housing and formed in an L-shape;
a second guide stopper formed at one end of the second guide body housed in the second damper body, and configured to prevent the second guide body from separating from the inside of the second damper body to the outside; and
a second guide ring formed on the second guide stopper and connected to the second elastic part,
wherein the third guide part comprises:
a third guide body inserted into the first and second damper body, formed in a U-shape, and having the brush mounted thereon;
a first third guide stopper formed at one end of the third guide body, and configured to prevent the third guide body from separating from the inside of the first damper body to the outside
a second third guide stopper formed at another end of the third guide body, and configured to prevent the third guide body from separating from the inside of the second damper body to the outside;
a first third guide ring formed on the first third guide stopper and connected to the first elastic part;
a second third guide ring formed on the second third guide stopper and connected to the second elastic part;
a plurality of spraying parts formed in a longitudinal direction of the third guide body formed in a hollow shape; and
a fluid blocking part formed in the third guide body, and configured to block a fluid from flowing to the first and second damper, the fluid being supplied through the cleaning part, wherein the cleaning part is configured to supply fluid to the third guide body such that the fluid is sprayed onto the window cover through the plurality of spraying parts.

2. The LiDAR sensor of claim 1, wherein the cleaning part comprises:
 a cleaning solution supply part configured to supply a cleaning solution to the window cover through the plurality of spraying parts; and
 a gas supply part configured to supply gas for removing the cleaning solution supplied onto the window cover through the plurality of spraying parts or drying the window cover.

3. The LiDAR sensor of claim 1, wherein each of the first and second damper body has a first insertion hole formed at one side thereof such that the first and second guide body are inserted into the respective first insertion hole, and a second insertion hole formed at an other side thereof such that the third guide body is inserted into the second insertion hole,
 the first insertion hole has an inner diameter smaller than outer diameters of the first and second guide stoppers, and
 the second insertion hole has an inner diameter smaller than an outer diameter of the third guide stoppers.

* * * * *